No. 791,680.

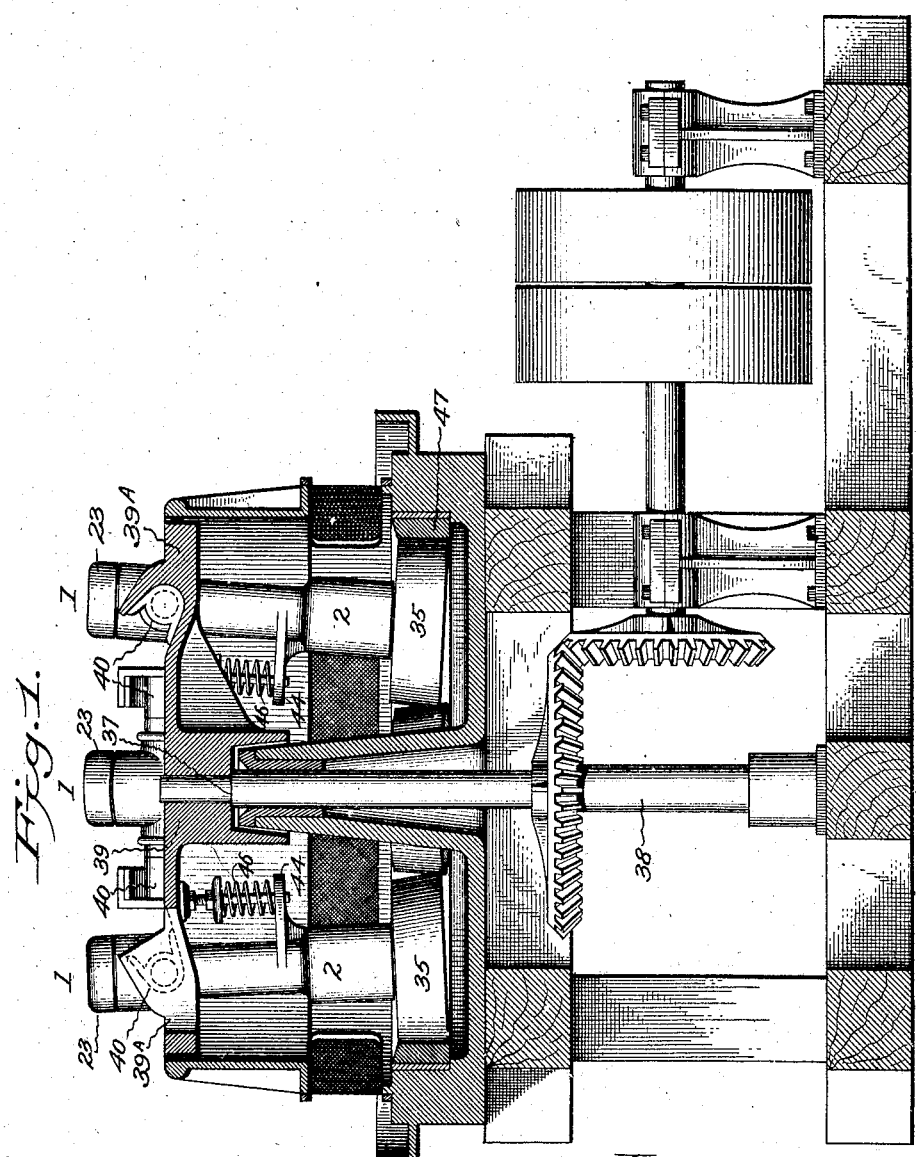

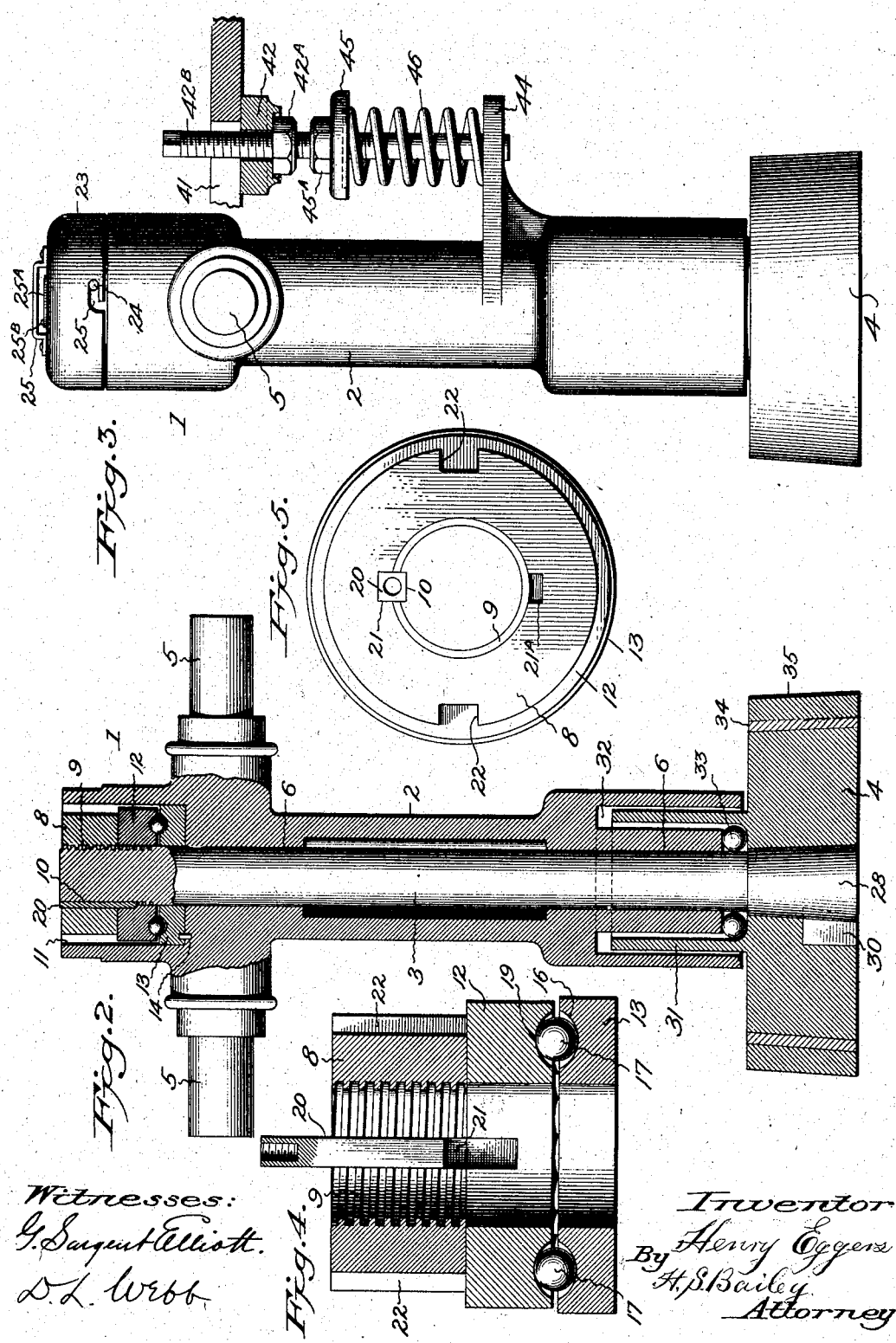

Patented June 6, 1905.

UNITED STATES PATENT OFFICE.

HENRY EGGERS, OF DENVER, COLORADO.

ROLLER-BEARING MULLER FOR HUNTINGTON MILLS.

SPECIFICATION forming part of Letters Patent No. 791,680, dated June 6, 1905.

Application filed July 25, 1904. Serial No. 218,061.

*To all whom it may concern:*

Be it known that I, HENRY EGGERS, a citizen of the United States of America, residing in the city and county of Denver and State of Colorado, have invented certain new and useful Improvements in Roller-Bearing Mullers for Huntington Mills; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in mullers for Huntington ore-pulverizing mills; and the objects of my invention are, first, to provide a ball-bearing muller; second, to provide a roller-bearing between the roller-head and the bottom of the supporting-sleeve of the muller; third, to provide a ball-bearing for the top of the roller-head's supporting-shaft in the top of the roller-head's supporting-sleeve; fourth, to provide means for positively holding the roller against the die-ring with a variable resilient pressure. I attain these objects by the mechanism illustrated in the accompanying drawings, in which—

Figure 1 is a sectional view of a Huntington mill, showing the application of my improved roller-bearing muller to it. Fig. 2 is a sectional elevation of my improved muller. Fig. 3 is a side elevation of Fig. 2. Fig. 4 is an enlarged fragmentary section of the adjustable nut of the roller-head's supporting-shaft, and Fig. 5 is a top plan view of Fig. 4.

Similar numerals of reference refer to similar parts throughout the several views.

Referring to the drawings, the numeral 1 designates my improved muller. This muller comprises the supporting-sleeve 2, the shaft 3, and the roller-head 4. The supporting-sleeve 2 is provided near its upper end with trunnions 5, which project at right angles to its vertical axis from its opposite sides. The sleeve is provided with a central axial bore 6 at its opposite end portion, which is chambered out larger at the center of the sleeve to form clearance-space. In this bore I rotatably mount the vertical shaft 3. This vertical shaft is supported in the sleeve by a nut 8, which is threaded to its upper end, which is provided with a thread 9 for a short distance from its end and with a keyway 10, that extends from the end of the shaft to the end of the thread. The nut fits into a counterbore 11, formed in the upper end of the sleeve. This counterbore is made a little larger in diameter than the nut and extends into the sleeve deep enough to receive the nut and a pair of ball-race collars 12 and 13. The lower collar 13 rests on the bottom of the counterbore and is secured thereto against rotative movement therein by a dowel-pin 14, one end of which is driven tight into a hole drilled in the bottom of the collar, while the opposite end projects from the collar and fits loosely into a hole drilled into the bottom of the counterbore. In the upper side of this collar I form a circumferential recess 16, which forms a ball-race and in which a row of the balls 17 is placed. Above this collar I place the collar 12, which rests on the balls 17. In the bottom of this collar I form a circumferential ball-race 19, which fits over the balls 17.

The nut 8 is screwed down on top of the collar 12 and is keyed to it by the feather-key 20, which is placed loosely in the keyway 10 of the shaft and in either one of the keyways 21 and 21$^A$, formed in the nut and a short distance on the collar 12. The top of the feather-key is provided with a threaded hole in which a screw or a piece of wood may be screwed to withdraw the key from the keyway. The nut and collar are thus secured to the top of the shaft and rotate with it on the ball-bearing between the collars, and the ball-bearing supports the vertical weight of the shaft. The nut 8 is used to adjust the muller-ring relatively to the die-ring. In the opposite sides of the nut 8 slots 22 are formed, in which a suitable spanner-wrench is placed to turn the nut on the shaft. A cap 23 fits loosely over the end of the sleeve and shaft and is secured to the sleeve by a pin 24, which is secured in the side of the sleeve and which projects loosely through a right-angled slot 25, that is formed in the cap and that extends into it from its edge. This cap is provided with a handle 25 and with an oil-hole through its top which is covered with a cover 25^A. This cover is secured at one side by a pin 25^B, which allows the cover to be swung around, so as to uncover the oil-hole.

The lower end of the shaft terminates in an outwardly or diverging tapering end portion 28, which extends beyond the lower end of the sleeve and on which is mounted the roller-head 4 of the muller. This roller-head is keyed to the tapering end of the shaft by a tapering key 30, which is secured in its keyway in the end of the shaft, and the roller-head is placed over the small end of the shaft and is driven onto the taper end of the shaft and onto the key at the same time. The roller-head is provided with a hollow hub 31, which extends loosely into a circumferential recess 32, formed in the lower end of the sleeve, which is deeper than the length of the hub in order to form room for vertical adjustment of the roller-head. The long hub also keeps the ore from the bearings. A ball-bearing is also formed between the lower end of the sleeve and the roller-head. I preferably form this ball-bearing inside of the hub of the roller-head and between it and the shaft, in which space I place a circumferential row of balls 33, that are arranged to bear and run against the end of the sleeve. This ball-bearing receives the upward thrust of the roller-head, which is caused by its riding on the bed of ore in the pan of the mill.

The periphery of the roller-head is convergingly tapering toward the sleeve, and a wood packing 34 is placed around it, and around the wood packing a steel roller-shell 35 is secured, the said shell being held upon the head by the taper of its inner periphery, which causes it to frictionally engage the wood packing. Upon a shoulder-bearing 37 near the top of the driving-shaft 38 of the Huntington mill is rigidly secured a muller-support 39, having projecting arms 39^A, which support the trunnions of the sleeves in the boxes 40, which rest in recesses in the ends of the arm 39^A. I form a recess 41 in each of these muller-supporting arms, and on the under side of each arm, below the recess, I place cross-bar 42, in the under side of which I form a socket or recess. In this recess I place a nut 42^A, the threaded aperture of which registers with a hole in the cross-bar, and through the nut and cross-bar passes the threaded upper end of a rod 42^B, the lower end of which extends loosely through a hole formed in a bracket 44, that is formed on and projects from the side of the sleeve at a short distance above its lower end and at a short space below the arm to which the rod is threaded. The rod extends above the arm and a wrench-receiving square or polygonal surface is formed on its end. The threaded portion of the rod extends below the arm, and a flange 45 is placed upon the rod just below the nut 42^A of the arm, and a coiled expansive spring 46 is placed around the rod between the top of the bracket 44 and the under side of the flange 45. The flange is adjusted upon the spring by a nut 45^A. This spring is used to hold the roller-ring against the die-ring 47 of the mill with any desired resilient pressure by screwing the rod down through the arm and compressing the spring between the flange and the bracket, which throws the lower end of the sleeve and the roller-ring outward against the die-ring.

The operation of my improved roller-bearing muller is as follows: In a Huntington mill the center shaft rotates the arms and the mullers, the steel roller-rings of which are thrown out and run against the die-ring by centrifugal force and grind and pulverize ore between them, the mullers swinging out on their trunnions in the boxes of the arms which are rotated by the center shaft. The wear of the balls can be taken up at any time by manipulation of the nut. The steel roller-ring bears and rolls against the ring-die by centrifugal force due to the rapid rotation of the muller within the shell of the mill, and thus the shaft and the roller-ring are rotated rapidly on their ball-bearings in the sleeve. It has been found in practice that the centrifugal force is not always strong enough to insure a constant, even, and steady rolling motion of the roller-ring on the die-ring and that the steel roller-ring is apt to slip, and when it does slip very quickly wears a flat place on the surface of the steel roller-ring and in a short time this ring will have a lot of flat places on its surface. These flat places decrease the grinding capacity of the muller and also tend to make the roller slip on the die-ring.

My improved spring-pressure device effectually obviates this fault, as additional pressure can be exerted on the muller by adjustment of the spring-rod against the sleeve of the muller to hold the roller-ring against the die-ring with any desired pressure. This additional pressure is also useful when pulverizing hard ores, which grind very slowly when only the centrifugal force of the muller can be applied to them, as the spring can be adjusted to give any desired pressure of the roller-head and its steel ring against the ore and die-rings.

My invention is simple and durable and makes a practical roller-bearing and adjustable pressure-muller, which in turn is driven by the gearing and pulleys below the mill. The shaft of the muller is adjusted in its sleeve by turning the nut to bring both the muller-ring and the die-ring in proper running relation, which can be done, and the nut stopped on the thread with one of its keyways registering with the keyway in the shaft, when the feather-key is inserted and both of the caps replaced and secured.

Having described my invention, what I claim as new, and desire to secure by Letters Patent, is—

1. In a muller for Huntington mills the combination of the sleeve, the shaft rotatably mounted in said sleeve, the collar surrounding said shaft and fixed in said sleeve, the ball-race in the top of said collar, the circumferential row of balls in said ball-race, the rotating collar provided with a ball-race resting on said balls, the nut threaded to the end of said shaft and bearing on said collar and the keyway and feather-key in said shaft and nut and collar for securing said nut and collar to said shaft in adjusted positions, substantially as described.

2. In a muller for Huntington mills, the combination with the driving-shaft having a bracket secured upon its upper end, of a vertically-disposed sleeve having trunnions near its upper end, which are supported by said bracket; a shaft in said sleeve which depends from bearings in the upper end thereof, and extends beyond the lower end thereof; a tapered roller-head on the lower end of said shaft; a wooden packing-ring of like taper on said roller-head, and a tapered steel ring on said packing-ring; a bracket extending from the side of said sleeve, a vertically-disposed coiled spring interposed between said bracket and the bracket on the top of the driving-shaft, and means for varying the tension of said spring, substantially as described.

3. In a muller for Huntington mills, the combination with the driving-shaft having a bracket upon its upper end of the sleeve in swinging engagement with said bracket; the shaft mounted in said sleeve; a fixed collar in the top of said sleeve, having a ball-race in its top face; a plurality of balls in said race; a collar screwed upon said shaft having a ball-race which rests upon said balls; a nut on said shaft upon said collar, and means for locking said nut and collar to the shaft; an arm extending from said sleeve; a rod, the upper end of which is threaded to said bracket, while its lower end passes through the arm; a collar on said rod; a coiled spring interposed between said arm and collar; a nut for varying the position of the collar, and a jam-nut for preventing the turning of the rod, substantially as described.

In testimony whereof I affix my signature in presence of two witnesses.

HENRY EGGERS.

Witnesses:
G. SARGENT ELLIOTT,
D. L. WEBB.